United States Patent
Leis et al.

(10) Patent No.: US 10,182,082 B2
(45) Date of Patent: Jan. 15, 2019

(54) USER IDENTITIES FOR PTT AND MCPTT

(71) Applicant: NOKIA SOLUTIONS AND NETWORKS OY, Espoo (FI)

(72) Inventors: Peter Leis, Penzberg (DE); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/573,629

(22) PCT Filed: May 13, 2015

(86) PCT No.: PCT/EP2015/060585
§ 371 (c)(1),
(2) Date: Nov. 13, 2017

(87) PCT Pub. No.: WO2016/180488
PCT Pub. Date: Nov. 17, 2016

(65) Prior Publication Data
US 2018/0131730 A1    May 10, 2018

(51) Int. Cl.
*H04L 12/06* (2006.01)
*H04L 29/12* (2006.01)
(Continued)

(52) U.S. Cl.
CPC ...... *H04L 65/1073* (2013.01); *H04L 61/2069* (2013.01); *H04L 61/3085* (2013.01);
(Continued)

(58) Field of Classification Search
CPC ............. H04L 65/1073; H04L 65/1016; H04L 61/2069; H04L 61/3085; H04L 65/4061; H04L 61/3095; H04L 12/06
(Continued)

(56) References Cited

U.S. PATENT DOCUMENTS 7,590,843 B1 * 9/2009 Khalil ............... H04L 9/083
380/247
2009/0298500 A1 * 12/2009 Beckmann ........ H04L 29/12188
455/435.1
(Continued)

FOREIGN PATENT DOCUMENTS

WO     WO 01/26322 A2    4/2001
WO     WO 2013/190503 A1  12/2013

OTHER PUBLICATIONS

International Search Report & Written Opinion dated Apr. 21, 2016 corresponding to International Patent Application No. PCT/EP2015/060585.
(Continued)

*Primary Examiner* — Inder P Mehra
(74) *Attorney, Agent, or Firm* — Squire Patton Boggs (US) LLP

(57) ABSTRACT

It is provided a method, comprising supervising if an information in a registration request is received from a registrar of a network domain, wherein the information comprises an application identity of a user of a terminal device and a network identity; storing, based on the received information, a binding between the application identity and the network identity; determining the network identity based on the binding and a received first request for establishing a communication to the terminal device; providing, based on the received first request, to the network domain, a second request for establishing the communication towards the terminal device, wherein the second request is based on the determined network identity.

11 Claims, 2 Drawing Sheets

(51) Int. Cl.
*H04L 29/06* (2006.01)
*H04W 12/06* (2009.01)

(52) U.S. Cl.
CPC ...... *H04L 61/3095* (2013.01); *H04L 65/1016* (2013.01); *H04L 65/4061* (2013.01); *H04W 12/06* (2013.01)

(58) Field of Classification Search
USPC ............... 370/312; 709/204, 245; 455/435.1
See application file for complete search history.

(56) References Cited

U.S. PATENT DOCUMENTS

| | | | | |
|---|---|---|---|---|
| 2014/0325603 | A1* | 10/2014 | Evans | H04L 63/08 726/4 |
| 2016/0205519 | A1* | 7/2016 | Patel | H04L 67/1002 455/518 |
| 2016/0226937 | A1* | 8/2016 | Patel | H04L 65/4061 |
| 2016/0269876 | A1* | 9/2016 | Senese | H04L 61/106 |
| 2017/0142756 | A1* | 5/2017 | Lee | H04W 76/005 |

OTHER PUBLICATIONS

3GPP TR 23.779 V0.7.1 (May 2015), Technical Report, 3rd Generation Partnership Project; Technical Specification Group Services and System Aspects; Study on application architecture to support Mission Critical Push to Talk over LTE (MCPTT) services (Release 13), May 4, 2015, pp. 1-152, XP050966446.

3GPP TS 23.179 V0.1.1 (Jun. 2015), Technical Specification, 3rd Generation Partnership Project; Technical Specification Group Services and System Aspects; Functional architecture and information flows to support mission critical communication services; Stage 2 (Release 13), Jun. 2015.

3GPP TS 23.228 V13.2.0 (Mar. 2015), Technical Specification, 3rd Generation Partnership Project; Technical Specification Group Services and System Aspects; IP Multimedia Subsystem (IMS); Stage 2 (Release 13), Mar. 2015.

* cited by examiner

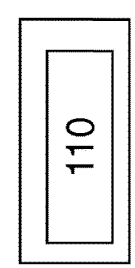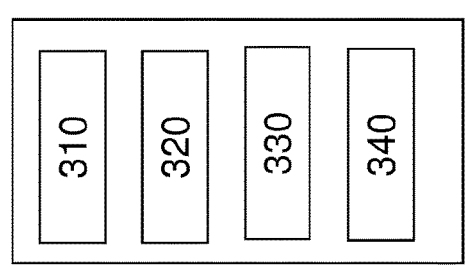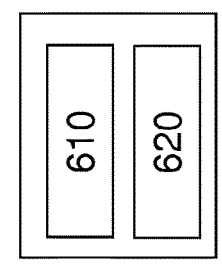

USER IDENTITIES FOR PTT AND MCPTT

FIELD OF THE INVENTION

The present invention relates to an apparatus, a method, and a computer program product related to push to talk. More particularly, the present invention relates to an apparatus, a method, and a computer program product related to mission critical push to talk.

Abbreviations

3GPP 3rd Generation Partnership Project
AS Application Server
BM-SC Broadcast Multicast Service Center
CN Core Network
CSCF Call Session Control Function
EPC evolved Packet Core
eMBMS evolved MBMS
E-UTRAN evolved UTRAN
GPRS General Packet Radio Service
HSS Home Subscriber Server
ID Identifier
IMPI IMS Private User Identity
IMPU IMS Public User Identity
IMS IP Multimedia Subsystem
IP Internet Protocol
LTE Long Term Evolution
LTE-A LTE Advanced
MBMS Multimedia Broadcast Multicast Service
MCPTT Mission Critical Push To Talk
MCPTT PU MCPTT Public User Identity
MME Mobility Management Entity
MS Mobile Station
OAM Operation, Administration and Maintenance
PTT Push To Talk
RAN Radio Access Network
RTP Real-Time Transport Protocol
R-URI Request URI
SA System Architecture
S-CSCF Serving CSCF
SIP Session Initiation Protocol
SGSN Serving GPRS Support Node
TETRA Terrestrial Trunked Radio
TS Technical Specification
UE User Equipment
UICC Universal Integrated Circuit Card
UMTS Universal Mobile Telecommunications System
URI Uniform Resource Identifier
UTRAN UMTS Terrestrial Radio Access Network
WiFi Wireless Fidelity
WLAN Wireless Local Area Network

BACKGROUND OF THE INVENTION

3GPP SA6 is currently specifying Mission Critical Push To Talk (MCPTT) over LTE application. MCPTT replicates the push to talk service behaviour provided in legacy systems like TETRA or P.25. This service is typically used for Public Safety applications.

The service has typically the following characteristics:
Two or more users participate in a group communication;
Users have to request for permission to talk, traditionally by pressing a button on their handset;
Only one user can talk at a certain time, all others are just listeners.

One of the architectural alternatives for so called "on network operation" describes that the MCPTT application runs on top of the IP multimedia core network (IM CN) subsystem. The MCPTT architecture and procedures will be described in 3GPP TS 23.179 and the IMS architecture and procedures are described in 3GPP TS 23.228. Generally speaking, MCPTT allows a user to talk to other users of a group similar to a Walkie Talkie communication service.

MCPTT supports two types of calls, namely a group call and a private call. The group call allows one speaker to talk to a group of users, while the private call allows two MCPTT users to talk to each other.

Typically, the MCPTT server can leverage MCPTT specific user identities and alias information to setup MCPTT calls, both for group calls as for private calls. MCPTT private calls will be routed via the MCPTT application server.

The MCPTT public user identity is an identity that is used to setup calls to a certain user. The identities are of the form of a URI and may look like
SIP URI fireman-joe-smith@fire.chicago.us

SUMMARY OF THE INVENTION

It is an object of the present invention to improve the prior art.

According to a first aspect of the invention, there is provided an apparatus, comprising requesting means adapted to request registering at a registrar device of a network domain by a registration request based on a network identity, wherein the registration request comprises the network identity and an application identity different from the network identity.

The apparatus may further comprise ciphering means adapted to cipher the application identity, wherein the registration request comprises the ciphered application identity.

According to a second aspect of the invention, there is provided an apparatus, comprising supervising means adapted to supervise if an information in a registration request is received from a registrar of a network domain, wherein the information comprises an application identity of a user of a terminal device and a network identity; binding storing means adapted to store, based on the received information, a binding between the application identity and the network identity; determining means adapted to determine the network identity based on the binding and a received first request for establishing a communication to the terminal device; providing means adapted to provide, based on the received first request, to the network domain, a second request for establishing the communication towards the terminal device, wherein the second request is based on the determined network identity.

The first request for the communication may comprise the application identity.

The first request may request the communication for members of a group having a group identity; and the apparatus may further comprise group storing means adapted to store an association of the application identity to the group identity; deriving means adapted to derive the application identity from the association and the first request; and the determining means may be adapted to determine the network identity based on the binding and the application identity derived by the deriving means.

The information may comprise the application identity as ciphered data, and the apparatus may further comprise deciphering means adapted to decipher the ciphered data to obtain the application identity.

According to a third aspect of the invention, there is provided an apparatus, comprising requesting circuitry configured to request registering at a registrar device of a network domain by a registration request based on a network identity, wherein the registration request comprises the network identity and an application identity different from the network identity.

The apparatus may further comprise ciphering circuitry configured to cipher the application identity, wherein the registration request comprises the ciphered application identity.

According to a fourth aspect of the invention, there is provided an apparatus, comprising supervising circuitry configured to supervise if an information in a registration request is received from a registrar of a network domain, wherein the information comprises an application identity of a user of a terminal device and a network identity; binding storing circuitry configured to store, based on the received information, a binding between the application identity and the network identity; determining circuitry configured to determine the network identity based on the binding and a received first request for establishing a communication to the terminal device; providing circuitry configured to provide, based on the received first request, to the network domain, a second request for establishing the communication towards the terminal device, wherein the second request is based on the determined network identity.

The first request for the communication may comprise the application identity.

The first request may request the communication for members of a group having a group identity; and the apparatus may further comprise group storing circuitry configured to store an association of the application identity to the group identity; deriving circuitry configured to derive the application identity from the association and the first request; and the determining circuitry may be configured to determine the network identity based on the binding and the application identity derived by the deriving circuitry.

The information may comprise the application identity as ciphered data, and the apparatus may further comprise deciphering circuitry configured to decipher the ciphered data to obtain the application identity.

In the apparatus according to any of the first to fourth aspects, at least one of the network identity may be an identity of a session initiation protocol; and the application identity may be an identity of a push to talk application.

In the apparatus according to any of the first to fourth aspects, the application identity may be an identity of a mission critical push to talk application.

According to a fifth aspect of the invention, there is provided a method, comprising requesting registering at a registrar device of a network domain by a registration request based on a network identity, wherein the registration request comprises the network identity and an application identity different from the network identity.

The method may further comprise ciphering the application identity, wherein the registration request comprises the ciphered application identity.

According to a sixth aspect of the invention, there is provided a method, comprising supervising if an information in a registration request is received from a registrar of a network domain, wherein the information comprises an application identity of a user of a terminal device and a network identity; storing, based on the received information, a binding between the application identity and the network identity; determining the network identity based on the binding and a received first request for establishing a communication to the terminal device; providing, based on the received first request, to the network domain, a second request for establishing the communication towards the terminal device, wherein the second request is based on the determined network identity.

The first request for the communication may comprise the application identity.

The first request may request the communication for members of a group having a group identity; and the method may further comprise storing an association of the application identity to the group identity; deriving the application identity from the association and the first request; and the determining may comprise determining the network identity based on the binding and the derived application identity.

The information may comprise the application identity as ciphered data, and the method may further comprise deciphering the ciphered data to obtain the application identity.

In the method according to any of the fifth and sixth aspects, at least one of the network identity may be an identity of a session initiation protocol; and the application identity may be an identity of a push to talk application.

In the method according to any of the fifth and sixth aspects, the application identity may be an identity of a mission critical push to talk application.

Each of the methods according to the fifth and sixth aspects may be a method of providing a user identity.

According to a seventh aspect of the invention, there is provided a computer program product comprising a set of instructions which, when executed on an apparatus, is configured to cause the apparatus to carry out the method according to any of the fifth and sixth aspects. The computer program product may be embodied as a computer-readable medium or directly loadable into a computer.

According to some embodiments of the invention, at least one of the following advantages is provided:
MCPTT communication is enabled;
Core network need not be configured to maintain application IDs such as MCPTT specific identities.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 2 shows an apparatus according to an embodiment of the invention;

FIG. 3 shows a method according to an embodiment of the invention;

FIG. 4 shows an apparatus according to an embodiment of the invention;

FIG. 5 shows a method according to an embodiment of the invention; and

FIG. 6 shows an apparatus according to an embodiment of the invention.

DETAILED DESCRIPTION OF CERTAIN EMBODIMENTS

Figure 1:
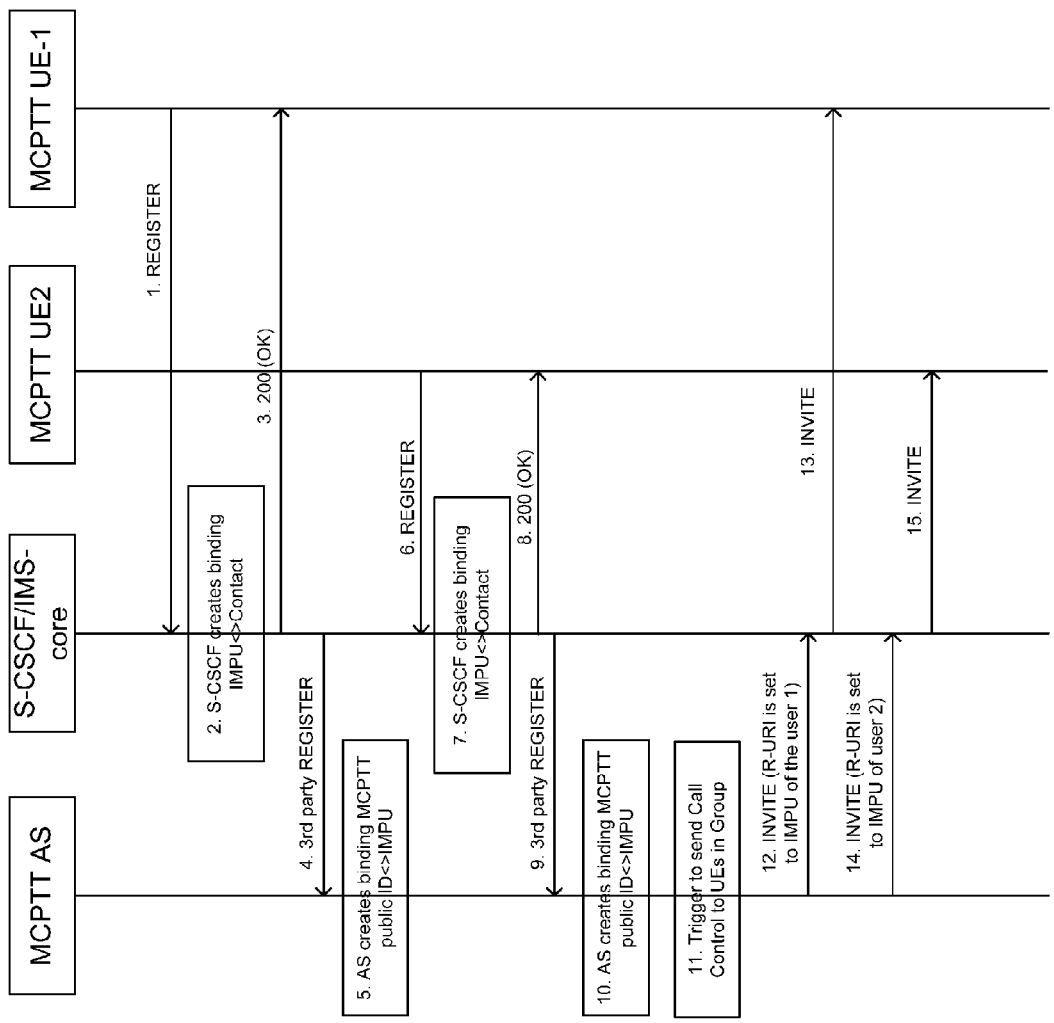
FIG. 1 shows a message flow according to an embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Throughout the present specification, an MCPTT public user identity (MCPTT PU) is an example of an "application ID", and MCPTT is an example of an application. An IMPU is an example of a "network ID".

Some embodiments of the invention provide a procedure which allows using MCPTT specific identities to setup MCPTT calls when the MCPTT application is using IMS capabilities. More in detail, some embodiments provide a procedure which allows routing MCPTT call control messages based on SIP using MCPTT specific public user identities for the case that the MCPTT application uses IMS provided functions (e.g. SIP routing capabilities).

The application identities such as MCPTT user identities may be different to user identities used in IMS (IMPU/IMPI). If a mobile operator owns not only the LTE infrastructure (E-UTRAN, EPC) but also the IMS, then public user identities used in IMS are stored on the UICC and in the operator's HSS. On the other hand, for some reasons such as security reasons, the Public Safety service provider (provider of the MCPTT service) uses own identities. Another reason for an application identity different from the network identity may be functional addressing provided by the MCPTT service. The user typically inputs his application identity into the terminal, more precisely, into a terminal application running on the terminal.

The IMS provider may not be allowed to correlate such a MCPTT identity with a user and track Public Safety users. The network operator may also not want or is not able to setup an infrastructure to maintain MCPTT identities. More generally, a Public Safety service provider should be able to operate its MCPTT service independently and autonomously from the mobile operator (only interconnection between the two domains for exchange of signalling and user plane data is required). On the other hand the Public Safety provider (MCPTT AS provider) should be aware of used IMS Public User Identities to enable proper routing of signalling messages through the IMS.

IMS requires IMS public user identities (IMPU) to be used in SIP signalling such that the S-CSCF can deliver the signalling to the appropriate user/UE. Reason is that the S-CSCF acts as the SIP registrar and keeps the binding between the IMS public user identity and the UE's contact address (e.g. IP address). So, for terminating calls, the S-CSCF determines the contact (e.g. IP address) to which a request has to be delivered based on the IMS public user identity provided in the SIP message (e.g. in a SIP INVITE message).

However, the MCPTT application (in UE and in MCPTT AS) will use the MCPTT public user identities as identifier in requests. S-CSCF may not be aware of an association between MCPTT public user identity and IMPU.

According to some embodiments of the invention, the following procedure is performed:

MCPTT user will register with IMS core. The SIP REGISTER request contains IMS public user identity (in general: network identity) and MCPTT public user identity (in general: application identity).

For example, one of the following encodings may be used for the application identity in the SIP REGISTER sent by the MCPTT UE: a new SIP header field, a body in the REGISTER request, or another appropriate encoding. Optionally, the application identity may be ciphered on a portion or the whole of the transmission from MCPTT UE (i.e. an UE having configured an MCPTT application) via IMS core to MCPTT AS.

The S-CSCF (representing part of an IMS core and acting as a SIP registrar) forwards both network identity and application identity to MCPTT AS. For example, according to some embodiments of the invention, S-CSCF packs the SIP REGISTER request which is received from the MCPTT UE into the body of the $3^{rd}$ party REGISTER message which is sent to the MCPTT AS.

The MCPTT AS creates a binding between the network identity and the (possibly de-coded/de-ciphered) application identity. This is performed per MCPTT user. The binding is stored in the MCPTT AS.

If group calls are supported, the MCPTT AS creates a mapping table for each MCPTT group. The mapping table shows the mapping between the group identity of the group and the application identity or identities comprised in the group. In addition, the mapping table may store the binding between network identity and application identity per user.

Whenever the MCPTT AS needs to send out a SIP INVITE to a MCPTT user, then the MCPTT AS will use the network identity of the MCPTT user as Request URI, wherein the network identity corresponds to the application identity. The application identity may be additionally transmitted in the SIP INVITE message.

This procedure may be used for one or both of MCPTT private and group calls. In case of private calls a SIP INVITE is establishing a session between two UEs, in case of group calls a UE can e.g. join an ongoing group call.

FIG. 1 shows an example message flow of an embodiment of the invention in detail for a MCPTT group call. In this example, the application server receives a trigger to send out call control signalling to all members of MCPTT Group-x (see action 11). Note that the message flow of FIG. 2 does not show all IMS nodes, but rather shows a collapsed view.

Action 1:

MCPTT UE-1 sends SIP REGISTER (authentication is not shown, may be performed according to the prior art) towards IMS core. The SIP REGISTER contains the IMPU (network identity) in "To" header field as per regular SIP procedures. The IMPU may be of the form sip:user1 public1@home-operator.net In addition, the SIP REGISTER contains the MCPTT public user identity (application identity of a user of UE1). Depending on detailed implementation, the application identity may be encoded as a SIP header field or in the body of the SIP REGISTER. Optionally the application identity may be ciphered by the MCPTT application in the UE. Key distribution for the ciphering is not considered in the present application. The application identity may have the form of a SIP URI, e.g.:

sip: fireman-joe-smith@fire.chicago.us

Action 2:

As per normal SIP procedures, the S-CSCF (registrar) creates the binding between IMS public user identity and contact address of UE-1 (e.g. IP address of UE-1).

Action 3:

The registration was successful, hence the S-CSCF sends 200 (OK).

Action 4:

The S-CSCF sends a 3$^{rd}$ party REGISTER to the MCPTT AS to inform the MCPTT AS that MCPTT UE-1 has registered. The 3$^{rd}$ party REGISTER comprises both the IMS public user identity (network identity) and the MCPTT public user identity (application identity) received from UE-1. For example, in some embodiments of the invention, the S-CSCF packs the SIP REGISTER received in Action 2 into the body of the 3$^{rd}$ party REGISTER.

Action 5:

MCPTT AS receives the 3$^{rd}$ party REGISTER. Based on the received IMS public user identity and the MCPTT public user identity, MCPTT AS detects that this is coming from a MCPTT user with the MCPTT public user identity. The MCPTT AS creates a binding between MCPTT public user identity (application identity) and IMPU (network identity), as shown in Table 1. In addition, in the case shown in Table 1, the user with the MCPTT public user identity is a member of Group-x. Hence, in the example, both application identity (MCPTT PU) and network identity (IMPU) are stored as being associated to Group-x.

TABLE 1

Association of MCPTT PU and IMPU of member 1 of Group-x

| Group | Member | Information element name | Information Source in SIP REGISTER | Description |
|---|---|---|---|---|
| Group-x | 1 | MCPTT PU | New header or body or other information element | MCPTT Public User identity sip: fireman-joe-smith@fire.chicago.us |
| | | IMPU | To: | IMS Public User Identity sip: user1_public1@home-operator.net |

Alternatively, MCPTT AS may store two tables: one table storing the application identities of the members of the group, and a second table storing the binding of each of the application identities to the respective network identity.

Action 6:

MCPTT UE-2 (which may be different from MCPTT UE-1; alternatively, it may be the same UE with a different application identity, e.g. in case of functional addressing, if the same person (same UE) has two different functions) sends SIP REGISTER (authentication is not shown, may be performed according to the prior art) towards IMS core. The SIP REGISTER contains the network identity (IMPU) in "To" header field as per regular SIP procedures. The IMPU may be of the form
sip:user2 public1@home-operator.net In addition, the SIP REGISTER contains the MCPTT public user identity (application identity of a user). Depending on detailed implementation, the application identity may be encoded as a SIP header field or in the body of the SIP REGISTER. Optionally, the application identity may be ciphered by the MCPTT application in the UE. Key distribution for the ciphering is not considered is the present application. The application identity may have the form of a SIP URI, e.g.:

sip: fireman-jeff-harper@fire.chicago.us

Action 7:

As per normal SIP procedures, the S-CSCF (registrar) creates the binding between network identity and contact address of UE-2 (e.g. IP address of UE-2).

Action 8:

The registration was successful, hence the S-CSCF sends 200 (OK).

Action 9:

The S-CSCF sends a 3$^{rd}$ party REGISTER to the MCPTT AS to inform the MCPTT AS that MCPTT UE-2 has registered. The 3$^{rd}$ party REGISTER comprises both the network identity and the application identity. For example, in some embodiments of the invention, the S-CSCF packs the SIP REGISTER received in Action 7 into the body of the 3$^{rd}$ party REGISTER.

Action 10:

MCPTT AS receives the 3$^{rd}$ party REGISTER. Based on the received IMS public user identity and the MCPTT public user identity, MCPTT AS detects that this is coming from a MCPTT user with the MCPTT public user identity (application identity). The MCPTT AS creates a binding between the application identity and the network identity (IMPU), as shown in Table 2. In addition, in the case shown in Table 2, the user with the application identity (MCPTT public user identity) is a member of Group-x. Hence, in the example, both application identity (MCPTT PU) and network identity (IMPU) are stored as being associated to Group-x.

TABLE 2

Association of MCPTT PU and IMPU of member 2 of Group-x

| Group | Member | Information element name | Information Source in SIP REGISTER | Description |
|---|---|---|---|---|
| Group-x | 2 | MCPTT PU | New header or body or other information element | MCPTT Public User identity sip: fireman-jeff-harper@fire.chicago.us |
| | | IMPU | To: | IMS Public User Identity. sip: user2_public1@home-operator.net |

Alternatively, MCPTT AS may store two tables: one table storing the application identities of the members of the group, and a second table storing the binding of each of the application identities to the respective network identity.

Actions 1 to 5 for UE-1 correspond to Actions 6 to 10 for UE-2. The sequences of actions 1 to 5 and of actions 6 to 10 may be performed consecutively or fully or partially in parallel.

Action 11 may follow at any time after at least one of actions 1 to 5 and actions 6 to 10 has been performed. Hereinafter, it is assumed that both actions 1 to 5 and actions 6 to 10 are performed when action 11 happens. If actions 1 to 5 have not been performed before action 11, SIP Invite in action 12 may not be successfully processed. If actions 6 to 10 have not been performed before action 11, SIP Invite in action 14 may not be successfully processed.

Action 11:

MCPTT AS receives a trigger to send Call Control signalling to all members of Group-x (e.g. from the dispatcher or via OAM). Based on the bindings created for MCPTT Group-x (in step 5 and step 10), the MCPTT AS determines the related IMS public user identities that belong to the MCPTT users. The MCPTT AS will use these IMS public user identities as R-URI for the related SIP INVITE messages that have to be sent out (actions 12 and 14).

Action 12:

MCPTT AS sends out SIP INVITE to MCPTT UE-1, R-URI is user1 public1@home-operator.net, i.e. the IMPU (network identity) of UE-1.

Action 13:

S-CSCF, based on the binding between IMPU and contact address, rewrites the R-URI to the Contact of MCPTT UE-1 and forwards the SIP INVITE to MCPTT UE-1.

Action 14:

MCPTT AS sends out SIP INVITE to MCPTT UE-1, R-URI is user2 public1@home-operator.net, i.e. the IMPU (network identity) of UE-2.

Action 15:

S-CSCF based on the binding between IMPU and contact address, rewrites the R-URI to the Contact of MCPTT UE-2 and forwards the SIP INVITE to MCPTT UE-2.

FIG. 2 shows an apparatus according to an embodiment of the invention. The apparatus may be a terminal such as a UE, a MS etc., or an element thereof. FIG. 3 shows a method according to an embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus comprises requesting means 110. The requesting means 110 may be a requesting circuitry.

The requesting means 110 requests registering at a registrar device of a network domain (S110) based on a network identity of a first user. The request to register is performed by a registration request (e.g. SIP REGISTER). The registration request comprises the network identity (e.g. IMPU). I.e., the network identity may belong to the network domain. Furthermore, the registration request comprises an application identity of a second user (e.g. MCPTT PU). The application identity may be different from the network identity. The application identity may belong to an application domain different from the network domain.

Typically, the network identity and the application identity belong to the same user of the apparatus (terminal). However, in general, they may belong to different users. For example, a first user may input his application identity into a terminal application which stores the application id. Then, the UICC comprising the network identity of the first user is exchanged such that the new UICC comprises a network identity of a second user. If the terminal application still stores the application identity of the first user, the registration request comprises the network identity of the second user and the application identity of the first user.

FIG. 4 shows an apparatus according to an embodiment of the invention. The apparatus may be a registrar of an application, such as an application server an element thereof. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises supervising means 310, binding storing means 320, determining means 330, and providing means 340. The supervising means 310, binding storing means 320, determining means 330, and providing means 340 may be a supervising circuitry, a binding storing circuitry, a determining circuitry, and a providing circuitry, respectively.

The supervising means 310 supervises, if an information is received in a registration request from a registrar of a network domain. The information comprises an application identity of a user of a terminal device and a network identity. The information (e.g. $3^{rd}$ party SIP REGISTER) may inform that the terminal device has registered to the network domain based on the network identity, and that the terminal device indicated to have the application identity.

The binding storing means 320 stores a binding between the application identity and the network identity (S320). The binding is based on the received information.

The determining means 330 determines the network identity based on the binding and a received request for a communication of the terminal device (S330). The received request for the communication may be based on the application identity. Alternatively or in addition, the received request for the communication may be based on a group id, wherein the apparatus stores an association of the application identifier and the group id.

The providing means 340 provides, based on the received request, to the network domain, a new request for establishing the communication towards the terminal device (S340). The new request for establishing the communication is based on the network identity. The new request for establishing the communication may be directed to a routing proxy of the network domain. For example, the registrar may also have a role of the routing proxy. Alternatively, the registrar may be different from the routing proxy.

FIG. 6 shows an apparatus according to an embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 3 and 5 and related description.

According to some embodiments of the invention, the IMS registrar (e.g. S-CSCF) is aware of both network identity (IMPU) and application identity (MCPTT PU) during registration. In order to reduce a potential security risk, the IMS registrar may remove the application identity from its memory after it has forwarded both network identity and application identity to MCPTT AS. Besides application identity may be ciphered, as described hereinabove as an option.

Embodiments of the invention are described related to MCPTT. However, embodiments of the invention may be applied to "simple" PTT, too. Furthermore, embodiments of the invention may be applied to other applications than MCPTT and PTT, if an identity used in the application should not be maintained in the IMS core network.

Some embodiments of the invention may be employed in a 3GPP network. They may be employed also in other 3GPP and non-3GPP mobile and fixed networks such as CDMA, EDGE, LTE, LTE-A, UTRAN, WiFi, WLAN networks, PSTN, etc.

A terminal may be a user equipment (UE) or another equipment which may attach to the radio access network of the respective technology. For example, a terminal may be a laptop, a PDA, a tablet, a machine-to-machine communication device, etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a terminal such as a UE, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example an application server such as a PTT AS or a MCPTT AS, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code;
the at least one memory and the computer program code configured to, with the at least one processor, cause the apparatus at least to
supervise if an information in a registration request is received from a registrar of a network domain, wherein the information comprises an mission critical push to talk identity of a user of a terminal device and an internet protocol multimedia subsystem public user identity;
store, based on the received information, a binding between the mission critical push to talk identity and the internet protocol multimedia subsystem public user identity;
determine the internet protocol multimedia subsystem public user identity based on the binding and a received first request for establishing a communication to the terminal device; and
provide, based on the received first request, to the network domain, a second request for establishing the communication towards the terminal device, wherein the second request is based on the determined internet protocol multimedia subsystem public user identity.

2. The apparatus according to claim 1, wherein
the first request for the communication comprises the mission critical push to talk identity.

3. The apparatus according to claim 1, wherein
the first request requests the communication for members of a group having a group identity; and the at least one memory and computer program code are further configured to cause the apparatus to
store an association of the mission critical push to talk identity to the group identity;
derive the mission critical push to talk identity from the association and the first request; and
determine the internet protocol multimedia subsystem public user identity based on the binding and the derived mission critical push to talk identity.

4. The apparatus according to claim 1, wherein
the information comprises the mission critical push to talk identity as ciphered data, and the at least one memory and the computer program code are further configured to, with the at least one processor, cause the apparatus to
decipher the ciphered data to obtain the mission critical push to talk identity.

5. The apparatus according to claim 1, wherein
the internet protocol multimedia subsystem public user identity comprises a session initiation protocol uniform resource identifier.

6. A method, comprising:
supervising if an information in a registration request is received from a registrar of a network domain, wherein the information comprises a mission critical push to talk identity of a user of a terminal device and an internet protocol multimedia subsystem public user identity;
storing, based on the received information, a binding between the mission critical push to talk identity and the internet protocol multimedia subsystem public user identity;
determining the internet protocol multimedia subsystem public user identity based on the binding and a received first request for establishing a communication to the terminal device;

providing, based on the received first request, to the network domain, a second request for establishing the communication towards the terminal device, wherein the second request is based on the determined internet protocol multimedia subsystem public user identity.

7. The method according to claim 6, wherein the first request for the communication comprises the mission critical push to talk identity.

8. The method according to claim 6, wherein the first request requests the communication for members of a group having a group identity; and the method further comprises storing an association of the mission critical push to talk identity to the group identity;

deriving the mission critical push to talk identity from the association and the first request; and the determining comprises determining the internet protocol multimedia subsystem public user identity based on the binding and the derived mission critical push to talk identity.

9. The method according to claim 6, wherein the information comprises the application identity as ciphered data, and the method further comprises deciphering the ciphered data to obtain the mission critical push to talk identity.

10. The method according to claim 6, wherein the internet protocol multimedia subsystem public user identity comprises a session initiation protocol uniform resource identifier.

11. A computer program product embodied on a non-transitory computer-readable medium, said product comprising a set of instructions which, when executed on an apparatus, is configured to cause the apparatus to carry out the method according to claim 6.

\* \* \* \* \*